United States Patent [19]

Metzdorff et al.

[11] Patent Number: 5,047,777
[45] Date of Patent: Sep. 10, 1991

[54] LINEAR METHOD OF NAVIGATION

[75] Inventors: Walter Metzdorff, Friedrichshafen; Peter Lux, Langenargen; Max Eibert, Friedrichshafen, all of Fed. Rep. of Germany

[73] Assignee: Dornier Luftfahrt gmbH, Fed. Rep. of Germany

[21] Appl. No.: 523,131

[22] Filed: May 14, 1990

[30] Foreign Application Priority Data

May 12, 1989 [DE] Fed. Rep. of Germany ....... 3915633

[51] Int. Cl.$^5$ ...................... G01S 13/89; G06F 15/50
[52] U.S. Cl. ........................................ 342/64; 364/456
[58] Field of Search ........................... 342/64; 364/456

[56] References Cited

U.S. PATENT DOCUMENTS 3,805,261  4/1974  Deschamps et al. ................. 342/64
3,810,175  5/1974  Bell ................................... 364/65 X
3,974,328  8/1976  Thomas et al. ................... 342/64 X
4,700,307  10/1987 Mons et al. ...................... 364/456 X

OTHER PUBLICATIONS

Anuta et al., "Map Matching System", IBM Tech. Disclosure Bulletin vol. 7, No. 5, Oct. 64, pp. 372-373.

Primary Examiner—Gilberto Barron, Jr.
Attorney, Agent, or Firm—Ralf H. Siegemund

[57] ABSTRACT

A method for aircraft navigation which includes, sensor signal processing with refernce data. The method provides for sensing and range finding the elevational profile underneath the craft. Those elevational data are fed to a segmentizing and type classifying unit whose output in turn is fed to a classifying unit, and that the position of the craft is determined by comparing the segmentized overflight strip with corresponding topographic features in reference information.

6 Claims, 3 Drawing Sheets

LINEAR METHOD OF NAVIGATION

BACKGROUND OF THE INVENTION

The present invention relates to a method of navigation and to a navigation method of updating the navigational information in an aircraft, and more particularly the invention relates to navigation which includes a sensor, signal processing devices and arrangement and a store for reference information.

Navigational methods of the kind to which the invention pertains usually operate as follows. An aircraft such as a regular airplane, a helicopter or any other kind of flying craft flies across a certain territory and scans the territory underneath. The scanning result is compared with reference data available in a suitable store in order to obtain nagivational and navigation correction. Aircraft usually employ a plurality of navigational systems. The basic system in an aircraft however is usually based on inertia, and that navigational system is supported either manually visually by the pilot or though telecommunication satellite range finding and so forth.

A variety of overflight navigational methods are known under names such as TERCOM, TERPROM, SITAN, SPARTAN, PENETRATE wherein the craft is located by scanning a territory strip across which the craft flies by means of radar in order to ascertain an elevational or range image. This scanning signal is digitized and compared with digitally available reference data of the same territory. One covers in one shot so to speak an area having several hundred meters length. An on board computer or the like compare the reference data with the acquired real time radar data. The reference data have been acquired originally by measuring elevation above a certain level and with reference to particular reference level. The scanned strip is then digitally compared with appropriate elevational digitized data. The Tercom method is for instance described in German Patent 3,016,901 which in turn refers to a paper in "Flight International", of 10/01/1977, pages 964/965. It is apparent that this kind of system works only if indeed there are significant elevational differences of a sufficiently pronounced nature for purposes of navigation; but whatever craft flies across flat areas, lakes or flat fields there simply is no or insufficiently pronounced information available which could be used for navigation. Clearly there are marginal areas with slight elevational differences but then one has to consider the margin of error and measuring tolerances.

DESCRIPTION OF THE INVENTION

It is an object of the present invention to provide a new and improved navigational system in which the position of the craft can be determined accurately and safely and in autonomous manner and independently from the season and the time of the day and any actuality as far as data is concerned.

It is therefore a specific object of the present invention to provide a new and improved method for aircraft navigation which includes, sensor signal processing in conjunction with reference data.

In accordance with the preferred embodiment of the present invention it is suggested to sense and range finding the elevational profile underneath the craft. Those elevational data are fed to a segmentizing and type classifying unit whose output in turn in fed to a classifying unit, and that the position of the craft is determined by comparing the segmentized overflight strip with corresponding topographic features in reference information. Parallel to this operation the reflected energy could be used; the processing equipment should of course correct speed errors or normalized the data as acquired to render then speed independent for ease of reference comparison.

It can thus be seen that preferably the elevational data are required by scanning the territory across which the craft flies by means of a radar laser. The resulting profile permits evaluation in a manner to be described more fully below structures particularly objects such as rivers and so forth even though the elevational characteristic features may be very minimal, can still be detected. Broadly speaking, the term profile segmentizing, i.e. segmentization of the sequentially acquired (laser radar) means that elevational data are structurally analyzed in terms of (a) regular vs random deviations from an average (b) amount of such deviations from one elevational data point to the next one (c) regularity of gradients in elevations and in which directions. (d) absence of any deviations. Establishing blocks or strips of uniform segments in this fashion establishes typing criteria such as "forests"; "flat land", "houses", "lakes".

The term "feature extraction" is used here for classifying purposes and is essentially related to the determination of the length of segments (size of the forest, of the lake, of house/villages) which length may be indirectly acquired from the spacing of transition points of different type segments in forest/field or lake/houses. It should be noted that segmentation as understood here, as well as signature and feature extraction is a linear version and simplification of the two-dimensional version as disclosed in copending application, Ser. No. 07/523,130 whose content is incorporated by reference.

The primary factor being considered is based on a range finding but by adding amplitude of the reflecting signal one obtains another feature for discrimination. As soon as the corresponding strip is segmentized and if necessary corrected under utilization of aircraft condition and state data, one can provide for comparison with stored reference data. These data include topographical information of the surface of the Earth including a kind of vegetation and whether or not there are built structures. This information can usually be acquired from maps or even simple aircraft pictures that have been previously taken and which are stored in a suitable format for use in the comparison operation. The result of the comparison between reference data and real time measuring data will in turn yield update information for the reference data.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from teh following description taken in connection with the accompanying drawings in which:

Proceeding now to the detailed description of the drawings, FIG. 1 is a block diagram of equipment by means of which the inventive navigational method can be carried out. The system shown in FIG. 1 includes a sensor SN, and an image correction stage BK that is connected to the sensor SN. Flight data such as speed elevation and so forth are acquired by a unit FD and are fed inter alia to the correction stage BK. The corrected data from the stage BK are fed to a segmentizing unit which organizes the data in segments to be described and feeds this organized data into feature extraction unit ME which in turn feeds feature or type defining data to a feature comparison unit MV under utilization of appropriate reference data stored in a computer memory store RSP.

The briefly described arrangrment operates as follows. The sensor SN provides e.g. an elevational radar line scan in the direction of flight, above the territory across which the craft flies. Circuit BK corrects and normalizes the image data of this strip from an inertial navigation that is included e.g. in the stage FD. This way, speed correction is provided so that one can say that the stage BK provides normalized or normalized data in terms os time/sequencing. In the case of a fully stabilized sensor system it is only necessary to provide speed correction. In the case of a fixed system the position in relation to the ground is calculated and considered on further processing.

The segmentation provided in the stage SG establishes groups of typical or critical data e.g. it singles out strips of forest, areas which have many buildings and so forth and there are of course complimentary segmentized strip data such as no-forest-no construction etc. This is necessary in order to provide e.g. special markings that indicate the beginning and end of of a forest, i.e. its boundaries, the beginning of a town on the like. This aspects is generally characterized as feature recognition carried out in a stage ME. The circuit MV now compares the signal recognition with any reference and correlation is calculated when and whether these reference data coincide with particular features or sets of features acquired of overflight.

Figure 1:
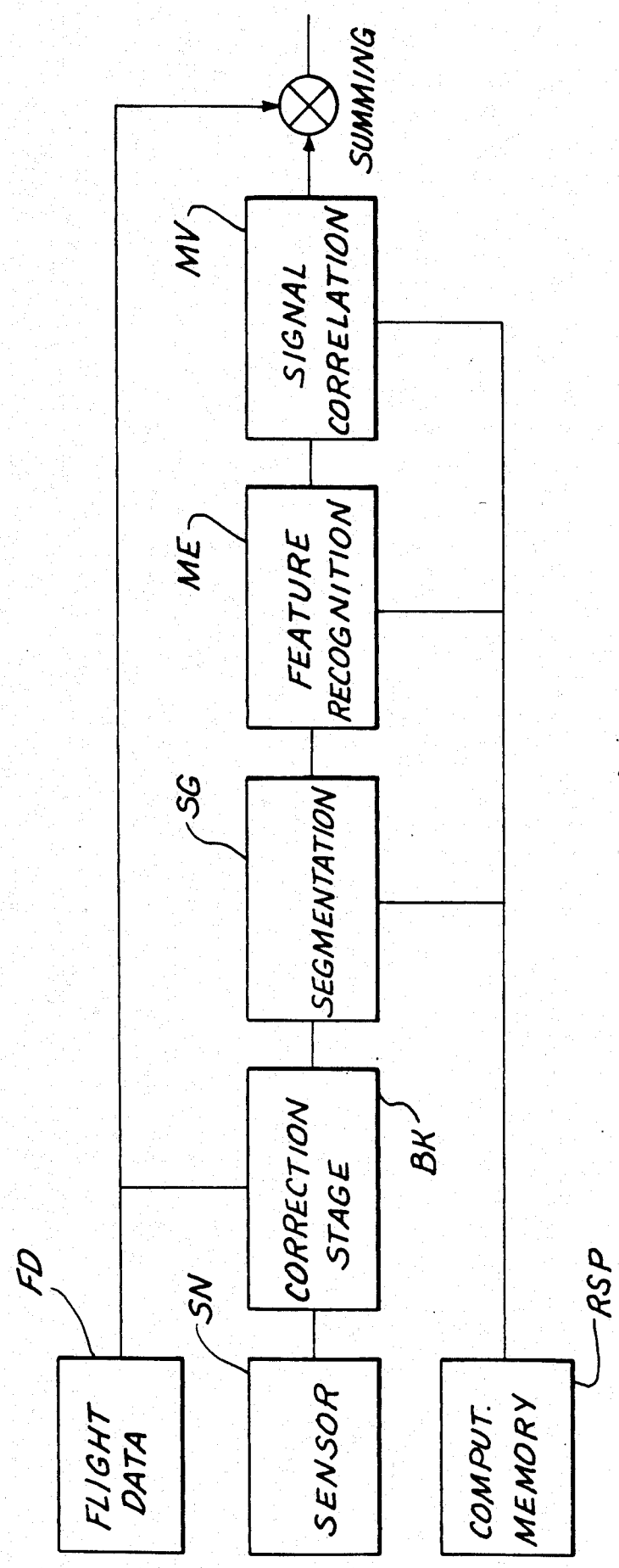
FIG. 1 is a block diagram for explaining the navigational method in accordance with the preferred embodiment of the present invention for practicing the best mode thereof.
Figure 2:
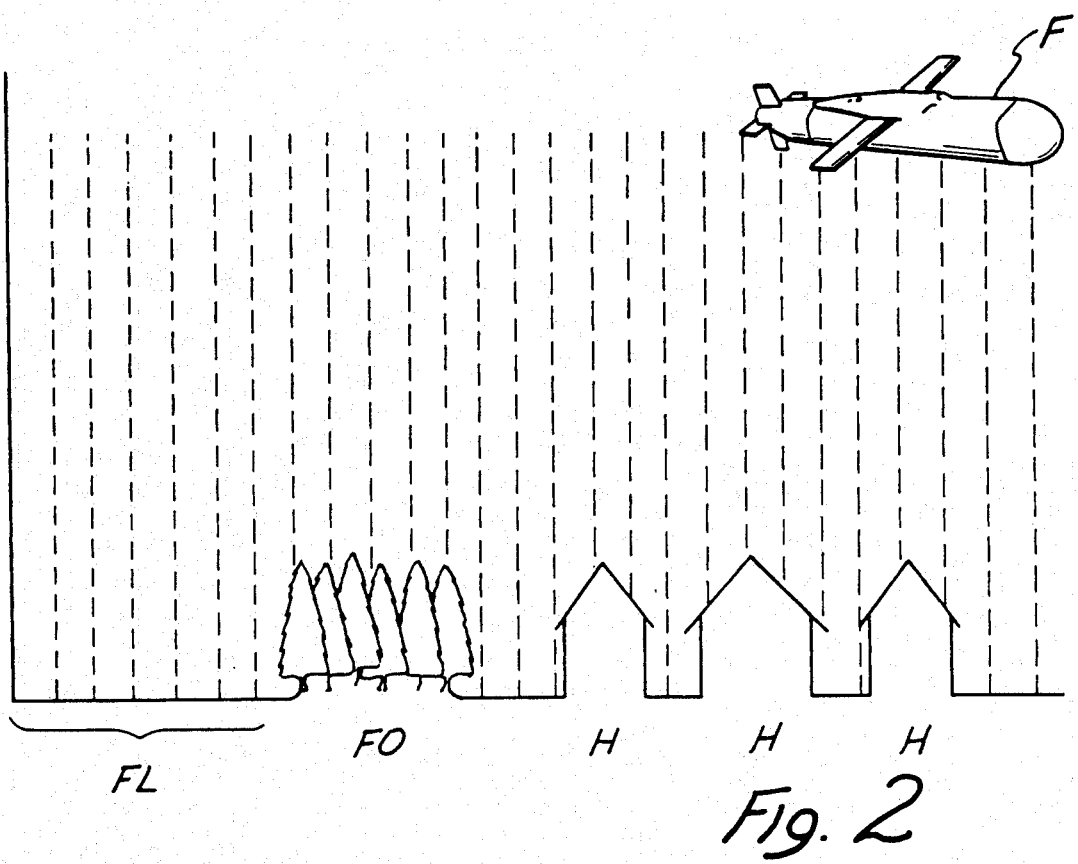
FIG. 2 illustrates a scanning pattern of a craft as crossing flat territory with different kind of growths and ground covers as well as construction objects.

Proceeding now to FIG. 2 that illustrates the practicing of the invention an aircraft F is assumed to be equipped with navigational system in accordance with the invention. This particular craft is assumed to have a sensor which takes an elevational profile as flying across the particular territory and it is assumed that this profile be taken in (or along) the plane of the drawing. The dotted lines represent the scanning pattern on a digitized basis as far as scaning points ar concerned. In other words the scanning may include the issuing of radar pulses in straight down direction and receiving a return echo. The scanner SN then determines the transit time. The scanning beam is quite narrow in (horizontal) cross-section so as to obtain a high resolution as far as reflection is concerned.

Figure 3:
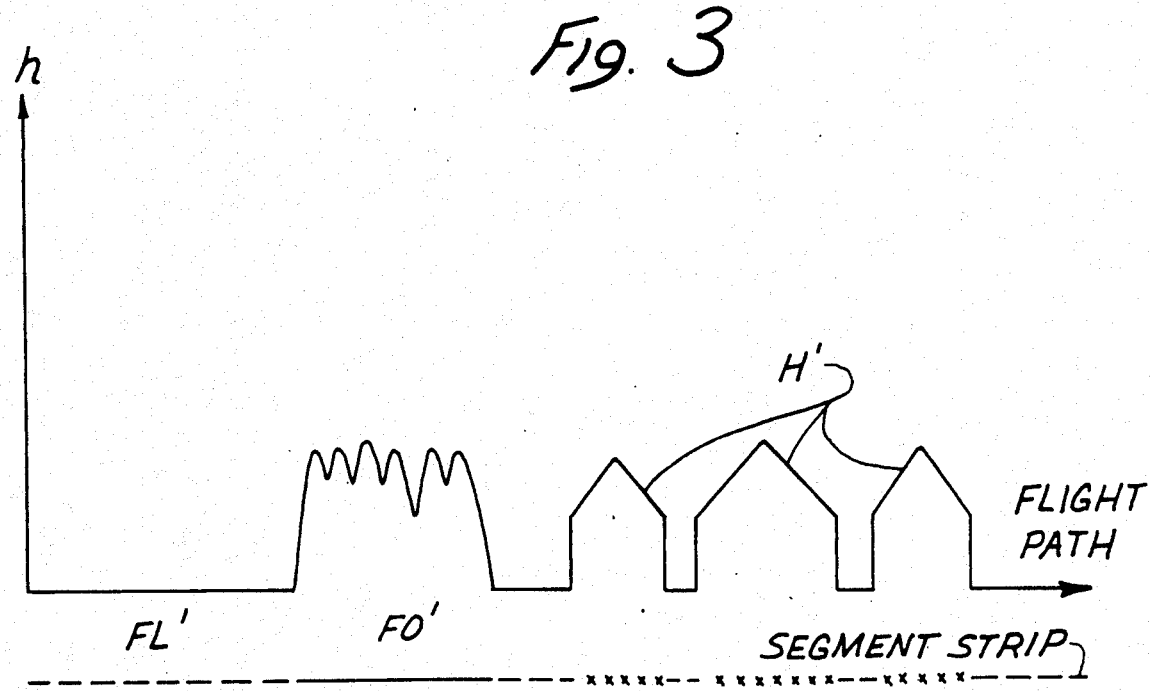
FIG. 3 is a schematic representation of comparing a scanned profile resulting from the scanning operation in FIG. 2 in conjunction with a scenic strip.

The scenery comprises, by way of example, a flat end portion FL, there is a forest FO in terms of growth or the like and there are several houses H. It is assumed that the sensor is an optical radar and as consequence an elevational profiled obtains as shown in FIG. 3. There is a forest portion FO' and the individual houses H are in fact identifiable from the radar elevational profile.

The segmentizing and feature recognition involves items such as determining texture, inclination patterns of surfaces and so forth individual objects can in fact be recognized and be so identified. For example, the area FL' is basically featureless with little or no texture which is recognized e.g. as a field or lake. In terms of scan-detection, this featureless area gives similar elevations for one measuring pulse after the other. Thus, when a sequence of similar elevation levels (equal transit times of radar pulses) is detected, an indication is provided to signify a textureless featureless profile. In the bottom of FIG. 3 this will be identified in a dash dot line pattern.

A "typical" forest has a profile shown in F' and will be so recognized as an irregular profile above the previously recognized ground level. Specifically there will be, within limits, more or less random variations in the elevations of sequentially produced profiles, resulting in an irregular profile pattern and distribution. This may well be distinguished from orchards or the like which may exhibit certain periodicity of rows of trees. This kind of arrangement is then recognized as forest, bushes or the like and within the identifying strip it may be identified by a solid line i.e. a continuous signal.

Houses are usually recognized by variable strong inclinations indicative of roof tops. In terms of elevation, there will be a regular pattern in gradients, i.e. differentials of alternating sign in the sequential elevational levels. This differential may be seen in case of flat roofs but there is regularity in up and down jumps in the profile representing the sequence, house-no house-house etc. These patterns are e.g. identified by markings such as crosses or the like.

Having identified classes or typical features of the overflight territory the overflight profile has thus been segmentized. These data are now used in order to establish the overflight path.

Figure 4:
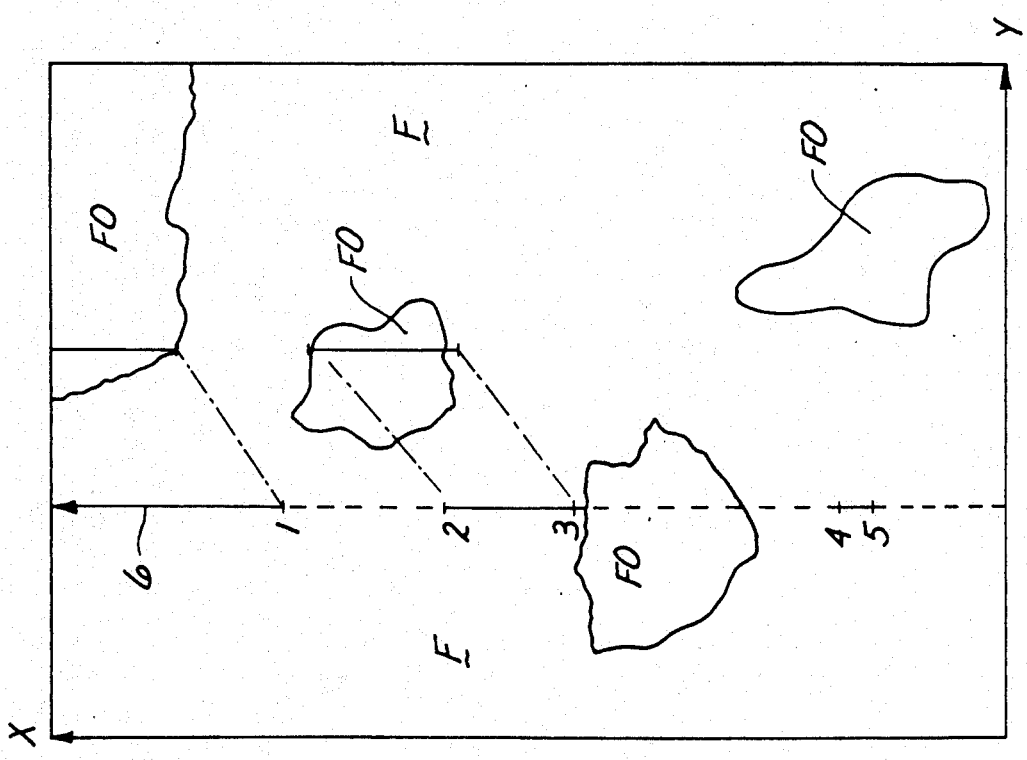

Proceeding therefore to FIG. 4 first example for comparison method is illustrated as it is carried out by means of the feature extractor HE and the comparator MV. What is specifically illustrated here is a section of a map which is the equivalent of a top elevation of the territory across which the craft flies and there is assumed to be superimposed a coordinate system in which the coordinate X is in the direction of flight and Y is the transverse coordinate but of course in the horizontal in either case. The FIG. 4 can also be interpreted as a kind of matrix indicating the reference data as they are being stored. Herein e.g. fields such as F are identified in a dot pattern, forests as continuous signal portion, houses in still a different fashion.

Reference numeral 6 illustrates the flight path as projected in the horizontal and as composed of the segmentized portions namely dotted lines indicative of fields, solid lines indicative of wood. Line 6 is the horizontal projection of the kind of the thin strip shown in the bottom line of FIG. 3. But the strip and map pattern is different in FIG. 4; only forests FO of various kinds and sizes are shown. Now, line 6 is a hypothetical overlay of the actual flight data and profile-segments, upon the reference data, i.e. the map. It can be seen that this overlay does not correspond to the actual reference situation. One can see specifically that actually there should be an offset along the dash dot lines. Looking at the upper part of FIG. 4 the feature 1 which is the beginning of a for largest st and the beginning of a field should actually be somewhere more to the right and ahead while the smaller forest identified by the thin strip solid line 2-3 is actually correspondingly a little to the right and in terms of reference data occurs a little later. In other words the aircraft is slightly off course to the left and a little fast.

In summary there is a field/forest transition 1, a forest/field transition 2; another field/forest transition 3; still another forest/field transition 4 and a field forest transition 5. The transitions in these cases are used as characterizing feature with a forest/field transition being one and a field forest the other one. This then is the function of the stage ME. It will be recalled that stage SG processed sequential radar echos and grouped them on the basis of regularities and irregularities; texture and textureless aspects. The stage ME now extracts transitions of these segments i.e. end and beginning points, and that extraction results in a pattern of transition points such as 5-1 in FIG. 4. The stage MV compares the patterns of transitions with reference patterns of the map. Looking at the map it is primarily composed of boundaries and these boundaries are compared on a line for line basis i.e. on basis of a hypothetical line pattern that runs parallel to the line 6, with the transition pattern of the overlay line 6.

In accordance with the calculation provided in the comparator the reference data are shifted e.g. in the -y-direction in this case as well as the x-direction until the distances between the various features in an alternating fashion i.e. field forest transition to the next transition is minimized. The distances may be calculated on the basis of mean absolute distance, or mean square difference, or one can use both for redundancy purposes. Generally it is not necessary that the flight is along a straight line since the information in crafts for coupling navigation permits determination of the position of the basis of measuring points which is very accurate. It is repeated that the local, on-board inertia navigation system provides speed and position data and includes a computer for coupling navigation to obtain these speed and position data as a first update. In each case speed and position is very accurately determined from the minimal correlation deviation and used in the update.

A so called Kalman filter establishes estimated values for position error terms and they can be used in order to limit the search area in the reference map. The smaller the search area obviously the more certain is the association between a transition pattern on one hand and the reference data for such patterns on the other hand; with relatively small (i.e. short) strips being sufficient the more unique a situation is presented. The length of a strip (6) for which correlation is sought may vary during flight in order to adapt the search-and-correlation pattern adn the variability of the situation. Also, the higher the overall altitude of the craft, the shorter should be the distance covered in order to avoid lead-lag time errors. In the extreme case the spatial difference between an expected (reference) and an actual transition may suffice for one particular transition in order to correlated the flight data. It is a matter of safety and redundancy to establish several parallel combinations of scene routes which are differently long.

Figure 5:
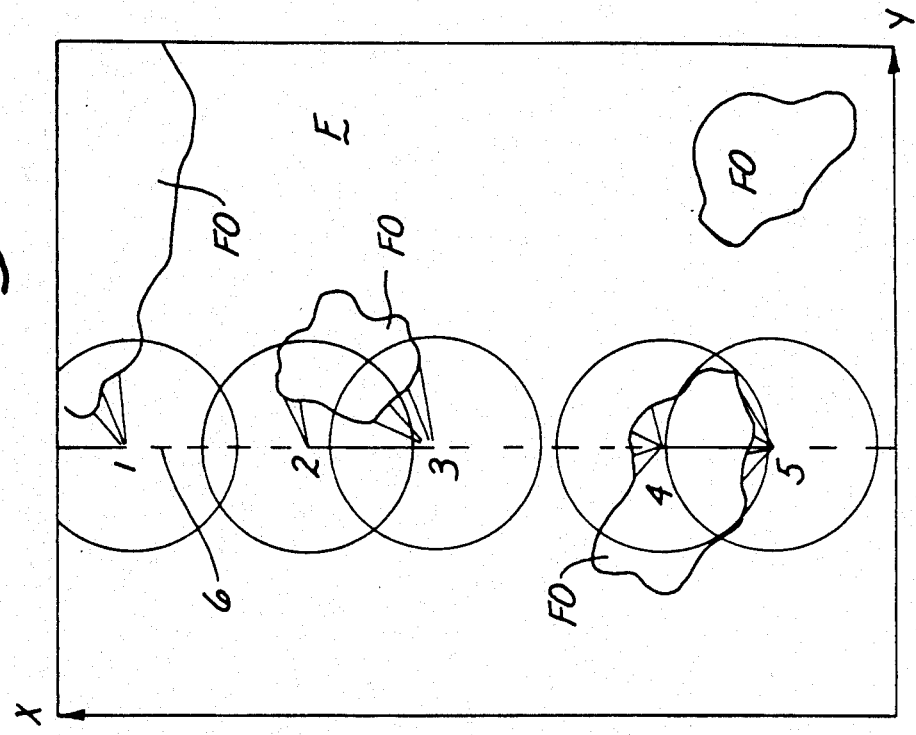
FIG. 4 and FIG. 5 show two different methods for utilizing data acquired on the basis of the operation described with reference to FIGS. 1–3 for purposes of determining the position of the craft in overflight.

FIG. 5 illustrates a different comparison method, also used for the direct determination of the craft's position and using same map that was shown in FIG. 4. Also there are the various transitions, as indicated by 1-5 in FIG. 4. Here then these acquired transitions along flight path 6 serve as a basis for a search pattern being of a circular nature to determine whether or not in fact there are corresponding transitions in the vicinity that is within the circle. In other words, the search method in FIG. 4 involved a parallel shift and longitudinal shift of the flight path pattern line 6, over the map until a best fit correlation is found. In the example of FIG. 5 the search is initiated by and from actual transitions, to find others in the respective search circle. Not the entire area within the circle should be covered for reasons of economy but only in discrete directions as indicated by the lines which emanate from the respected circle center. This approach is advantageous in order to limit the amount of calculation. Using, therefore, the determined overflight features as a basis for searching the reference data one will obtain i.e. find a number of reference data transitions, and a statistical evaluation in terms of fit maxima in certain directions will permit a proper association of the particular overflight transition with the reference transitions. In other words, the method uses a circle search pattern centered in a particular, actual transition between two different kinds or types of segments in the acquired data, and within circle one looks for similar type transitions in the reference data in discrete directions. Usually one will find several, in different directions and at different distances. This is repeated for each transition on strip 6, and one will find among the reference transitions in each instance, a particular one whose direction and distance more or less matches reference transitions found for the other acquired transitions and that in summary will give the shift vector. Direction and distance are then used in order to ascertain how far the craft has strayed from the path. As far as estimational errors of position accuracy is concerned one can include accuracy ellipses defined by about three times sigma, to reduce the number of transitions. This has to do with the reduction in expenditure in practicing the method in an economical fashion. In any event even in this case the number and spacing of transitions so acquired is used to determine how far the craft has strayed from the prescribed craft.

The invention is not limited to the embodiments described above but all changes and modifications thereof, not constituting departures from the spirit and scope of the invention, are intended to be included.

We claim:

1. Navigational method for aircraft under utilization of a sensor, a signal processing stage and a reference stage, including using the sensor to measure and determine at a high data resolution representing an elevational profile of overflight by linearly scanning across a flight path, the improvement comprising;

segmentizing the measuring data by detecting elevational scanning data patterns to persist over certain lengths of scanning and by detecting boundaries of these data pattern, different elevational patterns differ by changes in average elevation and by degrees of elevational variations about such average elevation; and by detecting specifically coordinate values in the these boundaries as indication for length values wherein the average elevation pattern remains uniform, the boundaries constituting patterns of segmentation of the measuring data;

identifying and classifying the segments in accordance with variables pertaining to and identifying different persistent at uniform patterns, in that different patterns in elevational data persisting for certain lengths of scanning, are bounded by said boundaries, so that together with the patterns of such boundaries there result identification of elevational patterns as persisting between pairs of boundaries; and ascertaining the position of the craft vis-a-vis reference data by comparing boundary patterns for identifying elevational pattern features are concerned with corresponding boundary patterns of reference information.

2. Method as in claim 1, including in addition evaluating the intensity of the reflection.

3. Method as in claim 1, including preparing the measuring data for correction of speed and position errors.

4. Method as in claim 1, including calculating lateral and forward or backward shifts of acquired said boundary patterns in one hand and the respective reference data on the other hand.

5. Method as in claim 1 and including varying said lengths for comparison purposes.

6. Method as claim 1, wherein the ascertaining step includes using the segmentization along a strip of particular length and shifting the strip laterally as well as longitudinally to obtain a best fit with reference data.

* * * * *